United States Patent [19]

Machi et al.

[11] 4,273,840
[45] Jun. 16, 1981

[54] BATTERY SEPARATOR AND METHOD OF PRODUCING THE SAME

[75] Inventors: Sueo Machi, Takasaki; Isao Ishigaki, Maebushi; Takanobu Sugo, Gunma; Kazuo Murata; Shiro Tanso, both of Takatsuki; Keizi Senoo, Takasaki, all of Japan

[73] Assignees: Japan Atomic Energy Research Institute, Tokyo; Yuasa Battery Co. Ltd., Osaka, both of Japan

[21] Appl. No.: 118,100

[22] Filed: Feb. 4, 1980

[30] Foreign Application Priority Data

Feb. 5, 1979 [JP] Japan ................... 54/11990

[51] Int. Cl.³ ........................................ H01M 2/16
[52] U.S. Cl. ............................... 429/144; 429/254; 427/35; 156/272; 204/159.11
[58] Field of Search ............... 429/206, 248, 219, 144, 429/254, 145; 427/35, 36; 156/272; 204/159.11

[56] References Cited

U.S. PATENT DOCUMENTS

| 2,816,154 | 12/1957 | Mendelsohn | 429/248 |
| 3,458,362 | 7/1969 | Arms | 429/206 |
| 4,078,127 | 3/1978 | Megahed et al. | 429/219 |
| 4,143,218 | 3/1979 | Adams et al. | 429/254 |
| 4,192,908 | 3/1980 | Himy et al. | 429/248 |

Primary Examiner—Donald L. Walton
Attorney, Agent, or Firm—Browdy and Neimark

[57] ABSTRACT

A battery separator composed of a composite sheet of film to which a monomer having a hydrophilic or electrolytic group is grafted is disclosed. Said film consists of a first polymeric layer containing a substance capable of catching a metal ion dissolved from a positive or negative active material and a second polymeric layer integrally bonded to either one or both sides of the first polymeric layer and which contains no such substance or contains it in a smaller amount that that contained in said first polymeric layer. Also disclosed is a method of producing a battery separator by irradiating such composite sheet of film with ionizing radiation and immersing the irradiated film in a solution of a monomer containing a hydrophilic or electrolytic group or bringing it into contact with the monomer solution to thereby graft the monomer to the film.

18 Claims, 1 Drawing Figure

BATTERY SEPARATOR AND METHOD OF PRODUCING THE SAME

BACKGROUND OF THE INVENTION

1. Field of the Invention

This invention relates to a separator for alkaline batteries, particularly zinc-silver oxide batteries using silver oxide or peroxide as cathode and zinc as anode, and nickel-zinc secondary batteries or other batteries using zinc as negative active material, as well as to a method of producing such separator. The separator is not only high in resistance to oxidation and alkalies but also it has the high ability to block the trans-migration of ions dissolved from a negative or positive active material.

2. Description of the Prior Art

The conventional zinc-silver oxide battery uses a separator made of regenerated cellulose membrane that retards the transport of dissolved silver hydroxide [Ag(OH)$_2$$^-$] from the positive electrode to the negative electrode. The membrane is itself oxidized with the silver hydroxide ions which in turn are reduced and form the deposit of metallic silver on the separator, thereby retarding the transport of silver hydroxide ions to the negative electrode. However, the oxidized membrane decays as a result of deterioration. In addition, the membrane is inherently susceptible to the oxygen evolved at the cathode and is not adequately alkali-resistant. For this reason, the conventional separator does not withstand extended use and the cell using it has only a limited cycle life.

SUMMARY OF THE INVENTION

The separator of this invention is free from the above described defects of the conventional separator. It is composed of a composite sheet of film to which a monomer having a hydrophilic or electrolytic group is grafted, and said film consists of a first polymeric layer containing a substance that reacts with silver hydroxide ions or zincate ions to form an insoluble substance in the electrolyte, namely a substance that is capable of catching metal ions dissolved from a positive or negative active material, and a second polymeric layer integrally bonded to either one or both sides of the first polymeric layer and which contains no such substance or contains it in a smaller amount than that contained in said first polymeric layer. By virtue of the chemical-resistant ion permeable layer placed on one or both sides of the first polymeric layer, the separator of this invention is not only high in chemical resistance but also it has high ability to block the trans-migration of silver hydroxide ions or zinc hydroxide ions from the positive or negative electrode to the negative (or positive) electrode.

DETAILED DESCRIPTION OF THE INVENTION

Figure 1:
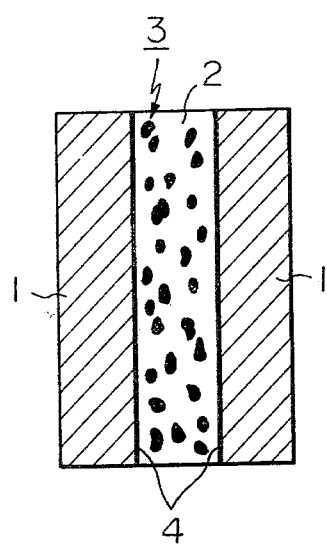
FIG. 1 schematically shows an enlarged cross section of a separator composed of a composite sheet according to one embodiment of this invention.

By reference to FIG. 1, the separator according to one embodiment of this invention comprises a polymeric film 1 onto which a monomer having a hydrophilic or electrolytic group has been grafted, and a polymeric sheet 2 having incorporated therein a metal ion catching substance 3 and which is fusion-bonded to the polymeric film 1.

According to this invention, the metal ion catching substance 3 is incorporated in a layer of synthetic resin which is integrally bonded to another layer of synthetic resin, and therefore, the substance continues to exhibit its function for many hours without coming off the separator. Any known method can be used to form an integral fused laminar structure of polymeric layers, and a paticularly advantageous method is to form between two second polymeric layers a molten synthetic resin containing a metal ion catching substance and which is to form a first polymeric layer, and pressing the three layers together while they are molten, followed by the cooling of such laminate.

The preferred metal ion catching substances are sulfur compounds and calcium compounds. When the desired separator is for use in zinc-silver oxide batteries, inorganic sulfides such as zinc sulfide, magnesium sulfide and calcium sulfide are used to advantage. Any silver oxide or peroxide dissolved into the electrolyte as silver hydroxide ions are held in the separator as silver sulfide so that they will not be discharged at the negative electrode to grow as silver dendrites. When a separator for use in nickel-zinc secondary batteries and other batteries that use zinc as negative active material is desired, calcium compounds such as calcium oxide, calcium hydroxide and calcium tartrate are used effectively. Any zinc hydroxide ion dissolved from the negative electrode reacts with these calcium compounds to form the deposit of calcium zincate on the separator. Therefore, there is no possibility that zinc dendrites that may shortcircuit the cell will be deposited on the negative plate during charge.

The polymer sheet (the first polymeric layer) containing a metal ion catching substance and the polymer film (second polymeric layer) that is to be fused to one or both sides of the polymer sheet are preferably composed of polyethylene, polypropylene and other olefinic thermoplastic resins because they are highly resistant to chemicals, easy to shape by thermoforming process, and grafting to them is eash to achieve. A monomer containing a hydrophilic or electrolytic group can be grafted onto such composite laminar structure by either radiation grafting upon exposure to ionizing radiation or chemical grafting. This invention is intended to achieve uniform grafting onto a solid polymer, and for this purpose radiation grafting is used with particular advantage.

This invention is now described in greater detail by reference to the following examples which are given here for illustrative purposes only and are by no means intended to limit the scope of the invention.

EXAMPLE 1

A low-density polyethylene (product of Asahi-Dow Co., Ltd.) having a melt index 2.0 and a density 0.292 was formed by inflation into a film 2.5 microns. The film was overlaid with a 35 microns thick non-woven cloth composed of polyethylene fibers (1–2 deniers) and which had a basis weight of 20 g/m$^2$. The particles of zinc sulfide of 100 mesh pass were dispersed throughout the non-woven cloth in an amount of 5 g/cm$^2$. The cloth was further overlaid with a polyethylene film of the same density and thickness as above. The laminar structure was passed between a pair of heated rollers (115° C.) to provide intimate contact between each layer. The resulting composite sheet composed of two polyethylene films and one zinc sulfide non-woven cloth layer was irradiated with electron beams at an acceleration voltage of 300 KeV and an acceleration current of 5 mA to give a dose of 30 Mrads. The irradiated sheet was immersed in an aqueous solution (25° C.) consisting of 50 parts of acrylic acid and 50 parts of water plus 0.25% of Mohr's salt the concentration of oxygen dissolved in said solution having been reduced to 0.1 ppm or less. The immersion time was 5 hours. Following washing with water, the sheet was dried to give a composite sheet 95 microns thick. The degree of graft of the polyethylene film was 105%. The sheet was found to have an electrical resistance of 210 milliohms per square centimeter as measured in 40% aqueous potassium hydroxide at 25° C. As will be demonstrated in Example 6 set forth below, the sheet could be used as a satisfactory battery separator. It was also found that the sheet of graft copolymer was given the ability to retain an adequate amount of electrolyte.

EXAMPLE 2

A composite sheet consisting of 20 microns thick non-woven cloth composed of 1–2 denier polypropylene fibers and having a basis weight of 10 g/m$^2$, a high-density polyethylene film 20 microns thick prepared by inflation of a high-density polyethylene (product of Asahi Chemical Industry Co., Ltd.) having a melt index 2.2 and a density 0.955 and zinc sulfide powder was prepared by repeating the procedure of Example 1. The resulting composite sheet was immersed in a solution consisting of 80 parts of benzene, 5 parts of carbon tetrachloride and 15 parts of acrylic acid and from which dissolved oxygen had been removed. During the immersion, the sheet was irradiated with gamma-rays from cobalt 60 for a period of 14 hours at a dose rate of $6 \times 10^3$ rad/hr. Following washing with water and drying, a composite sheet wherein the degree of graft of the polyethylene film was 85% was obtained. The sheet was found to have an electrical resistance of 190 milliohms per square centimeter as measured in 40% potassium hydroxide. The sheet could be used as a satisfactory battery separator.

EXAMPLE 3

A powder consisting of 90 parts of zinc sulfide and 10 parts of a low-density polyethylene resin (product of Asahi-Dow Co., Ltd.) having a melt index 2.0 and a density 0.292 was extruded through a T-die at 130° C. to form a film having a thickness of 17 microns. The film was sandwiched between low-density polyethylene films 20 microns thick and pressed together at 120° C. The resulting laminar structure was subjected to graft-copolymerization in the manner described in Example 1. A composite sheet having a thickness of 70 microns, a degree of graft of 120% and an electrical resistance of 170 milliohms per square centimeter was obtained, and it was suitable for use as a battery separator. In this example, since the first polymeric layer was bonded to the second polymeric layers under heating, the resulting composite sheet could be used without risk of the layers separating.

EXAMPLE 4

A composition consisting of 50 parts of a low-density polyethylene (product of Asahi-Dow Co., Ltd.) having a melt index 2.0 and a density 0.292 and 50 parts of zinc sulfide was extruded through a T-die to be cast in a thickness of 15 microns between two low-density polyethylene films of the same density 20 microns thick. The three layers were pressed together to form an integral laminar sheet. The sheet was subjected to graft-copolymerization in the manner used in Example 1. A composite sheet having a thickness of 55 microns, a degree of graft of 110% and an electrical resistance of 170 milliohms per square centimeter was obtained, this sheet was most suitable for use as a battery separator (see the data of Example 6 below).

EXAMPLE 5

A composition consisting of 50 parts of a high-density polyethylene resin (product of Asahi Chemical Industry Co., Ltd.) having a metal index 2.2 and a density 0.955 and 50 parts of calcium oxide was formed by inflation into one layer of film, which was sandwiched between two layers of a polyethylene resin of the same density that were also formed by inflation. The three layers were pressed together under heating and cooled to form a composite sheet. The sheet was subjected to graft-copolymerization in the manner described in Example 1. A composite sheet having a thickness of 45 microns, a degree of graft of 110% and an electrical resistance of 165 milliohms per square centimeter was obtained, and it was suitable for use as a battery separator.

EXAMPLE 6

Zinc-silver oxide cells using separators composed of the composite sheets prepared in Examples 1 and 4 as well as a zinc-silver oxide cell using a separator composed of the conventional regenerated cellulose membrane 30 microns thick were subjected to cycle-life tests.

The regenerated cellulose membrane was used in five layers put together side by side, whereas only a single layer of the composite sheets prepared in Examples 1 and 4 was employed. Each charge-discharge cycle consisted of charging at a current of 5 A for 20 hours until a final charging voltage of 2.05 volts was reached, and discharging at the 2-hr rate until the depth of discharge was 60%. The results of the cycle-life tests are set forth in Table 1 below.

TABLE 1

| Separator | Cycle-life |
| --- | --- |
| regenerated cellulose membrane | 160 ∞* |
| composite sheet of Ex. 1 | 220 ∞ |
| composite sheet of Ex. 4 | 230 ∞ |

*In Example 6, the symbol "∞" illustrates the number of discharge-charge cycles that a cell-battery will accomplish before failure.

As the table shows, the cells using the composite sheets of Examples 1 and 4 as separator had a longer cycle-life than the cell using a separator composed of regenerated cellulose membrane. The conventional cell required a great gap between electrodes because the separator was composed of five layers of regenerated cellulose membrane which swelled in the alkaline electrolyte to be about 3 times as thick as when it was dry. On the other hand, the cells using the separator of this invention required a smaller anode-to-cathode spacing which contributed to improved cell performance.

What is claimed is:
1. A battery separator comprising: a first layer of polymer having two major sides and containing a substance capable of catching a positive or negative active material in a metal ionic form, at least one second layer integrally bonded to at least one of said sides of the first layer of polymer forming a composite sheet of film and which contains no more such substance than that contained in said first layer of polymer, and a monomer having hydrophilic or electrolytic group grafted to said sheet of film.

2. A battery separator according to claim 1 wherein said substance capable of catching a positive or negative active material in a metal ionic form is a sulfide.

3. A battery separator according to claim 2, wherein said polymer is a polyolefin.

4. A battery separator according to claim 3, wherein said first and second layers are made integral by bonding them together with at least one of them being in a molten state.

5. A battery separator according to claim 2, wherein said first and second layers are made integral by bonding them together with at least one of them being in a molten state.

6. A battery separator according to claim 1, wherein said second layer of polymer is completely free of substances capable of catching positive or negative active material in a metal ionic form.

7. A battery separator according to claims 1 or 6 wherein said substance capable of catching a positive or negative active material in a metal ionic form is a calcium compound.

8. A battery separator according to any one of claims 1 to 7 wherein the polymer is a polyolefin.

9. A battery separator according to claim 8, wherein said first and second layers are made integral by bonding them together with at least one of them being in a molten state.

10. A battery separator according to claim 7, wherein said polymer is a polyolefin.

11. A battery separator according to claim 10, wherein said first and second layers are made integral by bonding them together with at least one of them being in a molten state.

12. A battery separator according to claim 7, wherein said first and second layers are made integral by bonding them together with at least one of them being in a molten state.

13. A battery separator according to claims 1 or 6 wherein said first and second polymeric layers are made integral by bonding them together with at least one of them being in a molten state.

14. A battery separator according to claim 1 or 6, wherein said at least one second layer of polymer consists of two such layers, respectively bonded to respective said major sides of said first layer.

15. A method of producing the battery separator in form of a composite sheet of film having a first layer of polymer with two major sides and containing a substance capable of catching a positive or negative active material in a metal ionic form and at least one second layer of polymer integrally bonded to at least one of the major sides of the first layer of polymer and which contains no more such substance than that contained in the first layer of polymer, the method comprising irradiating the sheet of film with ionizing radiation and immersing the irradiated sheet in a solution of a monomer containing a hydrophilic or electrolytic group to graft the monomer to the sheet of film.

16. A method according to claim 15, including providing said second layer of polymer as a layer completely free of substances capable of catching positive or negative active material in metal ionic form.

17. A method of producing the battery separator in form of a composite sheet of film having a first layer of polymer with two major sides and containing a substance capable of catching a positive or negative active material in a metal ionic form and at least one second layer of polymer integrally bonded to at least one of the major sides of the first layer of polymer and which contains no more such substance than that contained in the first layer of polymer, the method comprising irradiating the sheet of film with ionizing radiation, and bringing the irradiated sheet into contact with a solution of a monomer containing a hydrophilic or electrolytic group to graft the monomer to the sheet of film.

18. A method according to claim 17, including providing said second layer of polymer as a layer completely free of substances capable of catching positive or negative active material in a metal ionic form.

* * * * *